Aug. 30, 1955    H. N. BLISS    2,716,524
NUMERAL WHEEL ALIGNING MECHANISM
Filed June 2, 1952

INVENTOR.
HARVEY N. BLISS
BY
*Lindsey and Prutzman*
ATTORNEYS

United States Patent Office 2,716,524
Patented Aug. 30, 1955

2,716,524

NUMERAL WHEEL ALIGNING MECHANISM

Harvey N. Bliss, Windsor, Conn., assignor to Veeder-Root, Incorporated, Hartford, Conn., a corporation of Connecticut Application June 2, 1952, Serial No. 291,271

14 Claims. (Cl. 235—139)

This invention relates generally to counters and more particularly to a high speed counter in which there is a continuous transfer between the lower order counterwheels and means are provided to permit accurate reading thereof.

Accordingly one object of the invention is to provide an effective and practical arrangement for aligning the proper numerals on the individual counterwheels when it is desired to obtain a reading.

Another object of the invention is to provide a counter in which a reading cannot be obtained unless the device is properly operated.

The invention also has for an object the provision of mechanism for preventing breakage of any of the parts should the reading lever be manipulated when the counterwheels are actually rotating.

A further object of the invention is to provide a counter that will always produce an accurate indication of the number of counts or operations registered.

Still further features of the invention reside in the provision of a high speed counter that is of low cost, sturdy and simple construction.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 5:
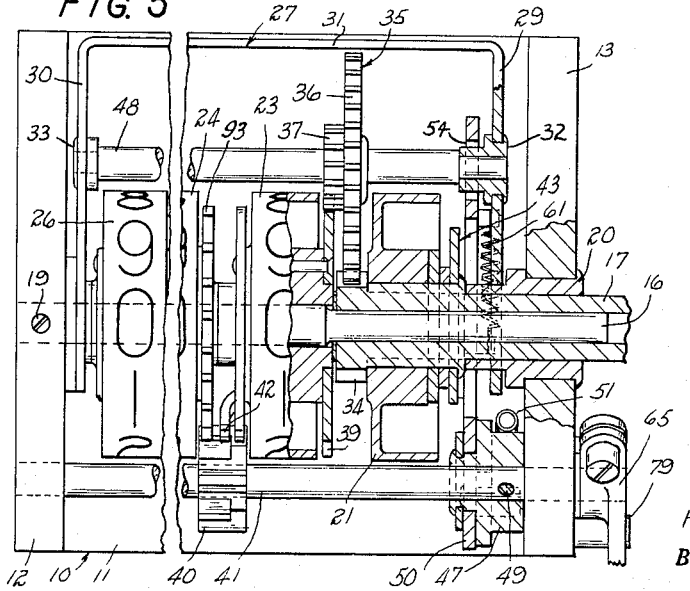
Fig. 5 is an enlarged, fragmentary view in section taken in the direction of line 5—5 of Fig. 4.

To illustrate the invention, the drawing shows a housing designated generally by the reference numeral 10 including a rectangular base 11, and walls 12 and 13, and a top plate 14, the latter being secured to the end walls by means of a plurality of screws 15. Through the agency of the walls 12 and 13 a pair of shafts 16 and 17 are supported, a set screw 19 serving to make fast one end of the shaft 16, although said shaft could be rotatably mounted if desired, and a bushing 20 rotatably supporting the other shaft 17. From Fig. 5 it will be seen that the shaft 17 is what is commonly termed a "quill shaft" and encircles the end of the shaft 16 lying opposite the set screw 19, the two shafts in this way mutually aiding in the support of each other to permit rotation of the shaft 17 about the shaft 16.

A counterwheel 21 is fixedly carried by the quill shaft 17 for rotation therewith, this wheel being the first number wheel or wheel of lowest order which typically carries from "0" to "9" units to be indicated and collectively bear the reference numeral 22. Although only one such digital unit is displayed in Fig. 1, any desired number of additional counterwheels 23, 24, 25 and 26 are rotatably journaled on the shaft 16 for relative movement with respect to each other. As in the case of the wheel 21, each of the last mentioned wheels bear numerals of succeeding higher order units, some of these numerals, which range from "0" to "9" in usual practice, being visible in Fig. 5.

Pivotally supported about the fixed shaft 16 and the bushing 20 is a U-shaped frame 27 comprising a pair of spaced legs 29, 30 and a briding portion 31. A shaft 48 is carried by the legs 29 and 30 of the frame 27, a pair of sleeve bearings 32 and 33 serving to rotatably support this shaft in a parallel relation to the common axis of the shafts 16 and 17.

Inasmuch as the instant invention contemplates a continuous transfer of the numerical information being registered on the counterwheel 21 to the next order wheel 23, a drive pinion 34 is integrally formed on the inner end of the quill shaft 17 and meshes with a transfer gear unit 35 composed of a reduction gear 36 and an intermediate pinion 37 connected together for unitary rotation. The desired 10:1 reduction ratio is completed by having the transfer or intermediate pinion 37 mesh with a driven gear 39 fixed to the counterwheel 23. In the illustrated embodiment it is intended that the number wheel 21 make ten revolutions for each revolution completed by the second order wheel 23.

Since the speed of the wheel 23 is appreciably lower than the first order wheel 21, it is within the contemplation of the invention to employ an intermittent transfer drive between the wheels 23—26, the lower speed of the wheel 23 readily permitting this. Accordingly, a series of mutilated pinions 40 are individually rotatable on a shaft 41 which itself is rotatably supported by the end walls 12 and 13. In view of the fact that the use of such pinions 40 is conventional, it need only be stated that each pinion 40 is driven by a two-toothed drive gear 42 and the pinions in turn respectively drive a driven gear 93 to establish intermittently the desired 10:1 transfer reduction ratios between the various number wheels 23—26. Thus, it will be seen that the transfer is continuous between the wheels 21 and 23 but intermittent between the wheels 21 and 23—26, since the drive gears 42 engage the mutilated pinions 40 only once each revolution.

In brief, the operation of the counter thus far described is as follows: The rotation of the quill shaft 17 which is connected in actual use to the particular mechanism, the revolutions of which are to be counted, causes the pinion 34 to rotate the gear 36. Rotation of the gear 36 in turn causes rotation of the pinion 37, since these two gears are directly connected together for rotation in unison, and being that the pinion 37 is in mesh with the driven gear 39 the wheel 23 is rotated in 10:1 correspondence with the wheel 21. As above stated, the rotation of the wheel 23 causes intermittent rotation of the mutilated pinions 40 by virtue of the two-toothed drive gear 42 to change the digits on the wheel 24 one at a time, that is, one digit for each of the revolutions of the wheel 23. This procedure is continued automatically throughout the remaining counter wheels to establish further reduction and of course the numerical carry over to the higher orders. Stated otherwise, the various wheels 21 and 23—26 represent different orders by virtue of a 10:1 relation between each pair of adjacent wheels.

However, from the above explanation, it will be apparent that any stoppage of the shaft 17 to permit a counting operation will in the vast majority of times result in the numerals carried by the wheel 23 being out of precise alignment. For example, supposing that the number "9" is registered on the wheel 21, then the wheel 23 has most of the numeral "1" in alignment with the numeral "9"

of the wheel 21. Even a thoroughly trained observer would be quite likely at times to read the total as "19" instead of the correct "9." This same condition prevails with reference to the other wheels 24, 25 and 26, although not as frequently, since any misalignment of the numerals on these various wheels would only occur during a transfer step, that is, when a two-toothed drive gear 42 is in mesh with a pinion 40. Nevertheless, the possibility of error is always present, as in the first two orders, any such error actually being more appreciable where higher numerals are concerned because the error is correspondingly greater.

Therefore, as hereinbefore mentioned, an object of the invention is to align properly the various numerals on the wheels 23—26 so that a ready and easy reading may be perfected. In view of the fact that the lowest order wheel 21 creates no source of error, since it is farthest toward the right and readily permits a true reading thereof, no need is presented for retrogressing this wheel. Actually, the wheel 21 allows ready interpolation of the various digits registered by it when the position of this particular wheel remains unchanged.

Accordingly, it is now desired that an understanding be had of the preferred mechanism for accomplishing the above result. As previously indicated, the frame 27 is pivotal about the common axis of the shafts 16 and 17. If the frame 27 is pivotal to an extent in direct correspondence with the various numerals 22 on the wheel 21, the amount of pivoting being correspondingly greater for the higher numbers, it will be seen that with the shaft 17 held motionless, as by the device the revolutions of which are being counted, the reduction gear 36 will revolve about the then stationary pinion 34 in planetary fashion to cause the pinion 37 to rotate the wheel 23 backward the requisite amount to align correctly the proper numeral. This feature will become clearer, it is believed, as the description progresses.

To accomplish the proper positioning of the frame 27, a cam or stop 43, shaped in conformity with the numerals "0" to "9" on the wheel 21, is carried by the wheel 21 for rotation therewith. As best viewed in Fig. 4, the cam or stop 43 is cycloidally configured starting with a high point 44 and decreasing smoothly in a counter-clockwise direction to a low point 45, thus leaving a rather abrupt inclined portion 46 immediately adjacent these high and low points. For a purpose presently to be made clear, the high point 44 corresponds to the numeral "0" on the wheel 21 and the low point to the numeral "9," and of course the gradual curving extending between these points corresponds to the various numerals between "0" and "9."

Fixed upon the rotatable shaft 41 is a collar 47, a pin 49 serving to assure rotation of the collar when the shaft is partially rotated. Circumscribing a portion of the collar 47 is a rocker arm 50 which is rotatable relative to the collar, being that one end of the rocker arm is only loosely fitted about said collar. However, provision is made for transmitting movement from the collar 47 to the rocker arm 50 by means of a spring 51 anchored at one end to the pin 49 and at its other end to another pin 52 carried by the rocker arm 50. The spring 51 is constantly under tension and an off-set lug 53 on the collar 47 in arresting engagement with the pin 52 prevents the spring 51 from causing rotation of the arm 50 except when the shaft 41 and collar 47 are rotated. The purpose in providing the above mentioned resilient connection between the collar 47 and the arm 50 will be explained more fully hereinafter. The opposite end of the rocker arm 50 is provided with an oversized aperture 54 which encircles a boss 55 forming part of the bearing 32, and in this way any motion of the rocker arm 50 is transmitted from this arm to the shaft 48 via the frame 27.

The cam 43 is intended to control the amount of movement possible with the rocker arm 50, consequently with the shaft 48, and with this in mind a cam follower or dog 56 is mounted on the arm 50. When the low point 45 is in radial alignment with the follower or dog 56, a greater degree of pivoting action is possible than when the high point 44 is in radial alignment therewith, and thus the limited movement of the rocker arm 50 and the frame 27 is indicative of the particular numeral uppermost on the wheel 21, it already having been stated that the cam 43 is cut or formed with this in view.

By reason of a pin 57 the cam follower 56 is rendered pivotal, and by virtue of a pin 59 and a pin 60, together with a spring 61, the follower is made yieldable to prevent damage by the relatively steep incline 46 on the cam 43 which would forcibly strike the follower should the follower be caused to engage accidentally the cam when the counter is in rotative operation. With the described arrangement it will be seen that the follower 56 is merely deflected from its normal position by the incline 46 without injury to it or any of the associated parts.

Figure 3:
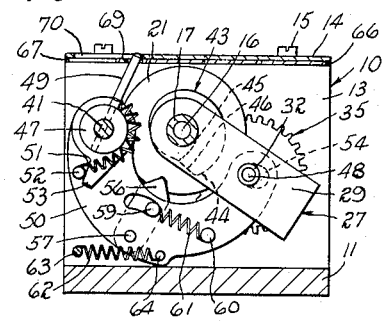
Fig. 3 is a sectional view taken in the direction of line 3—3 of Fig. 1.

To assure that the cam follower or dog 56 is normally disengaged from the cam or stop 43, a spring 62 stretched between a pin 63 on the wall 12 and a pin 64 on the rocker arm 50 serve as a biasing agency to move the said arm in a clockwise direction, thereby producing a movement of the frame 27 into the position depicted in Fig. 3 which is the normal running position. A reading lever 65 secured to one end of the shaft 41 permits ready partial rotation of said shaft to effect the reverse movement of the rocker arm 50 into the position illustrated in Fig. 4, this being the position of the various parts when a reading of the wheels 21 and 23—26 is desired.

In order to make certain that the lever 65 is depressed before a reading is attempted, the invention envisages the employment of a slidable shutter 66 having its ends tracked in a pair of grooves 67 one of which may be most clearly seen in Fig. 3. A dual use of the pin 49 is made in actuating the shutter 66, the pin extending into an aperture 69 provided in the shutter and projecting through an elongated slot 70 in the top plate 14 of the housing 10. A similar pin 71 is employed adjacent the other end of the shutter to avoid any cocking of the shutter in the grooves 67, it extending through a second aperture 72 and second slot 73. The top plate 14 is provided with a rectangular opening 74 and the shutter is provided with an L-shaped opening 75 having a longitudinal portion 76 registrable with the opening 74 when the shutter is in the position shown in Fig. 4, which is the reading position, and a transverse portion 77 of sufficient size to always expose the uppermost numeral on the wheel 21 to view irrespective of the particular position of the shutter 66. The purpose in having this latter transverse slot portion 77 is to permit the observer to ascertain whether the counter is in operation and for this reason the wheel 21 is never concealed by the shutter.

Figure 1:
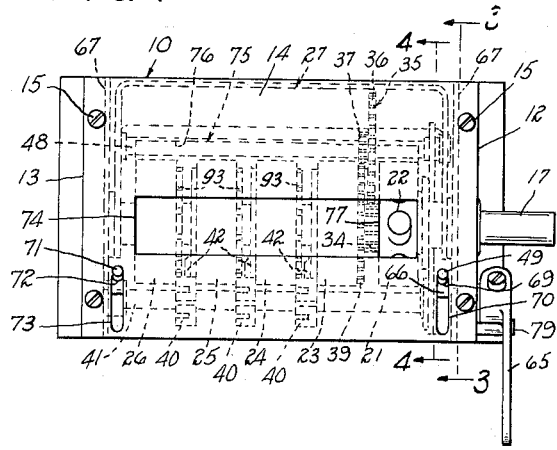
Fig. 1 is a plan view of the counter.
Figure 2:
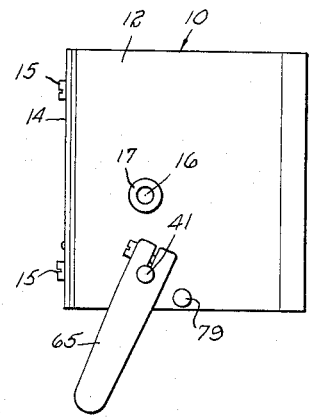
Fig. 2 is an end view of the counter.

While the functioning of my counter is believed obvious from the foregoing description, it is to be appreciated that once the quill shaft 17 has been stopped, the lever 65 must be depressed before a reading can be made, inasmuch as the shutter 66 is designed to conceal the wheels 23—26, only the wheel 21 being exposed, as will be apparent from Fig. 1. Because of the yielding nature of the spring 51, it will be seen that in each instance the lever 65 may be pressed against a stop 79 to effect full displacement of the shutter 66, thereby bringing the opening 76 into full registry with the opening 74.

Figure 4:
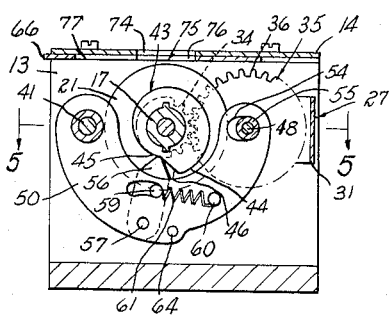
Fig. 4 is a sectional view taken in the direction of line 4—4 of Fig. 1.

Even though the lever is moved the same amount each time it is depressed, the rocking movement of the arm 50 is limited by the particular angular position of the cam 43. Fig. 3 represents the position of the arm 50 before the lever 65 is depressed and Fig. 4 illustrates the maximum amount of movement possible, inasmuch as in the assumed position shown the low point 45 of the cam is in radial alignment with the cam follower 56. As previously stated, the low point 45, that is, the smallest radius of the cam, corresponds to the numeral "9" on the wheel 21. Accordingly, since there is a continuous transfer between the wheels 21 and 23 it will be understood that the numeral "1" on the latter wheel is only slightly displaced from the center of the opening or window 74. Assuming that "9" is the total registered, to assure that this total will be accurately read the "1" on the wheel 23 should be rotated backwardly to bring the "0" squarely into view. Being that the cam 43 is designed to correspond to the various numerals on the wheel 21 and also because of the 10:1 reduction the wheel 23 will be automatically moved back nine-tenths of a revolution by the planetary movement of the transfer gear unit 35 when the rocker arm 50 is moved sufficiently to cause engagement of the follower 56 with the low point 45. Similarly, should the cam 43 be in a different rotative position, the amount of pivoting will be further limited depending upon the radius of the cam at the locus engaged by the follower 56, the high point 44, for instance, preventing any movement of the rocker arm 50, since this high point 44 represents the "zero" position of the wheel 21 and no retrograde movement of any of the wheels 23—26 is required for this registration.

Also, it should be noted that even at the times when the wheels 24, 25 and 26 are in the process of receiving carry-over or transfer information they too will be backed up because of their direct connection with each other at those times.

In this way any of the wheels, with the exception of the first wheel 21, will be rotated backwardly the requisite amount to produce an aligned condition relative to each other, thus requiring the observer to record only those numbers seen, since none of the numbers, other than those on the wheel 21, can be just partially in view.

While the spring 51 serves the purpose of permitting the shutter 66 to be fully actuated irrespective of the particular position of the cam 43, this spring serves an even more important purpose. Supposing that the inclined portion 46 were in radial alignment with the cam follower 56, such a condition indicating that the wheel 21 had stopped with sections of both the "0" and "9" visible, say slightly more of the "0" being exposed than the "9," then if the rocker arm 50 were directly manipulated by the observer, the cam follower 56 would be permitted to skid down the incline 46 to the lowest point 45 due to the yieldability of the spring 61. This would cause retrograde movement of the wheel 23 and the concomitant bringing into view the next lower digit on the wheel 23 when the observer would be reading the "0" on the wheel 21, since under these assumed conditions the major portion of this "0" would be showing. Obviously this would create an inaccuracy of "10" in the reading, a situation that of course could not be tolerated. However, by employing the spring 51, the follower 56 will remain in engagement with the incline 46 at any point therealong because the spring 51 will yield before the spring 61, the springs 51 and 61 being so selected. On the other hand, should the lever 65 be depressed when the counter is rotating, the spring 61 will permit deflection of the cam follower 56 when struck by the incline 46. Thus, it will be seen that it is within the purview of this invention not only to provide apparatus for obtaining an accurate reading but also to safeguard the various parts should the counter be improperly operated.

While in the above description relating to the specific embodiment shown in the drawings reference is made to the manual operation of lever 65 to align the number wheels and operate the shutter, it will be apparent to one skilled in the art that this operation could be done automatically whenever the counter is stopped merely by the use of electrical or mechanical actuating means responsive to movement of the counter or associated mechanism.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a counter, first and second counterwheel units mounted for relative rotation about a common axis, a first gear element mounted for rotation with said first unit, a second gear element mounted for rotation with said second unit, a transfer gear unit in mesh with said first and second gear elements, means for supporting said transfer unit for planetary movement about said common axis, a series of numbers carried by said counter units, cam means rotatable with said first counter unit having spaced portions individually corresponding to the various numbers on said first unit, and means associated with said transfer unit supporting means and engageable with said spaced portions to govern the planetary movement of said transfer unit about said common axis.

2. In a counter, first and second counterwheel units mounted for relative rotation about a common axis, a first gear element mounted for rotation with said first unit, a second gear element mounted for rotation with said second unit, a transfer gear unit in mesh with said first and second gear elements, means for supporting said transfer unit for planetary movement about said common axis, a series of numbers carried by said counter units, cam means rotatable with said first counter unit having spaced portions individually corresponding to the various numbers on said first unit, a pivotal member engageable with said transfer unit supporting means to cause planetary movement of said transfer unit about said common axis, a cam follower pivotally mounted on said pivotal member engageable with said cam means to limit movement of said pivotal member in one direction, and spring means urging said cam follower into one angular position.

3. In a counter, first and second counterwheel units mounted for relative rotation about a common axis, a first gear element mounted for rotation with said first unit, a second gear element mounted for rotation with said second unit, a transfer gear unit in mesh with said first and second gear elements, means for supporting said transfer unit for planetary movement about said common axis, a series of numbers carried by said counter units, cam means rotatable with said first counter unit having spaced portions individually corresponding to the various numbers on said first unit, a pivotal member engageable with said transfer unit supporting means to cause planetary movement of said transfer unit about said common axis, a cam follower pivotally mounted on said pivotal member engageable with said cam means to limit movement of said pivotal member in one direction, spring means urging said cam follower into an angular position, a lever for actuating said pivotal member, and a spring connected intermediate said member and said lever.

4. In a counter, a pair of counterwheel units of lower and higher orders mounted for relative rotation about a common axis, a drive pinion mounted for rotation with the lower order unit, a driven gear mounted for rotation with the higher order unit, a shaft, a transfer gear unit carried by said shaft including a pair of gears mounted for rotation in unison, one of said pair of gears being in mesh with said drive pinion and the other in mesh with said driven gear, frame means for supporting said shaft and said transfer unit for planetary movement about said common axis, a cam mounted for rotation with said lower order unit having a configuration corresponding to the order of indicia carried by said unit, and cam follower means associated with said frame means and engageable with said cam thereby to limit planetary movement of said shaft and transfer unit in accordance with the position of said cam.

5. In a high speed counter, first, second, and third counter units of succeeding orders mounted for relative rotation about a common axis, a drive pinion mounted for rotation with the first unit, a driven gear mounted for rotation with the second unit, a shaft, a transfer gear unit carried by said shaft including a pair of gears mounted for rotation in unison, one gear of said pair of gears being in mesh with said drive pinion and the other in mesh with said driven gear, frame means for supporting said shaft and said transfer unit for planetary movement about said common axis, a cam mounted for rotation with said first unit having a curvature corresponding to the order of indicia carried by said unit, cam follower means associated with said frame means and engageable with said cam thereby to limit planetary movement of said shaft and transfer unit in accordance with the position of said cam, a two-tooth drive gear mounted for rotation with the second unit, a driven gear mounted for rotation with said third unit, and mutilated pinion means engageable with said last mentioned drive and driven gears to transfer a predetermined numerical quantity from said second unit to said third unit.

6. In a counter, a pair of counterwheel units of lower and higher orders mounted for relative rotation about a common axis, means for rotating said lower order unit, a drive pinion mounted for rotation with the lower order unit, a driven gear mounted for rotation with the higher order unit, a shaft, a transfer gear unit carried by said shaft including a pair of gears mounted for rotation in unison, one of said pair of gears being in mesh with said drive pinion and the other in mesh with sad driven gear, frame means for supporting said shaft and said transfer unit for planetary movement about said common axis, a cam mounted for rotation with said lower order unit having a configuration corresponding to the order of indicia carried by said unit, and cam follower means associated with said frame means and engageable with said cam thereby to limit planetary movement of said shaft and transfer unit in accordance with the position of said cam.

7. In a counter, a fixed shaft, a quill shaft rotatably encircling a portion of said fixed shaft, a first counterwheel having spaced numerals thereon mounted on said quill shaft for rotation therewith, a second counterwheel rotatably supported on said fixed shaft, a shaft parallel to the axis of said fixed and quill shafts, frame means supporting said parallel shaft for swinging movement about the axis of said fixed and quill shafts, a pinion rotatable with said first wheel, a driven gear rotatable with said second wheel, intermediate gears carried by said parallel shaft for transmitting motion from said pinion to said driven gear in a predetermined ratio, a cam cut to correspond to numerals on said first wheel and rotatable therewith, a rocker arm for swinging said frame means, and a cam follower supported on said arm and engageable with said cam to limit pivotal movement of said arm in accordance with the rotative position of said cam and thereby permit a predetermined degree of swinging of said frame means and said intermediate gears.

8. In a counter, first and second counterwheels mounted for relative rotation about a common axis, each counterwheel carrying thereon a series of indicia in equally spaced peripheral increments, a first gear mounted for rotation with said first wheel, a second gear mounted for rotation with said second wheel, intermediate transfer gears meshing with said first and second gears, means supporting said intermediate gears for planetary movement about said common axis, a cam rotatively associated with said first wheel having a cam surface configuration to provide a high point corresponding to the zero digit on said first wheel and a low point adjacent thereto corresponding to the highest digit, intermediate points on said cam surface corresponding to the intermediate digits on said first wheel, and means associated with said frame engageable with said cam thereby to limit the amount of swinging movement possible with said frame and thus rotate said second wheel backwardly by means of said various gears to centrally position the next lowest digit on said second wheel for proper reading.

9. In a counter, first and second counterwheels, shaft means supporting said wheels for relative rotation with respect to each other, a first gear rotatable with said first wheel, a second gear rotatable with said second wheel, second shaft means, frame means supporting said second shaft means for swinging movement about the axis of said first shaft means, transfer gear means carried by said second shaft means, a cam rotatable with said first wheel, and cam follower means engageable with said cam to limit singing movement of said frame means a predetermined amount dependent upon the radius of said cam at any given rotative position thereof.

10. In a counter, first and second counterwheels, shaft means supporting said wheels for relative rotation with respect to each other about a common axis, a first gear rotatable with said first wheel, a second gear rotatable with said second gear, second shaft means at one side of said first shaft means, frame means supporting said second shaft means for planetary movement about the axis of said first shaft means, a pair of transfer gears meshing with said first and second gears, said transfer gears being supported by said second shaft means, a rocker arm pivotally mounted adjacent the other side of said first shaft means from said second shaft means and spanning said first shaft means in spaced relation therewith to engage said second shaft means for actuating said second shaft means in a planetary fashion about the axis of said first shaft means, a cam rotatable in unison with said first wheel, said cam having a low point corresponding to the highest digit on said first wheel and a high point corresponding to the zero digit on said wheel, the curvature of said cam being gradual between said points in one direction and abrupt in the other direction, a cam follower pivotally attached to said rocker arm and engageable with said cam, and a spring biasing said follower in a direction toward the abrupt portion intermediate said high and low points when said follower is in engagement with said cam and said cam is rotating whereby said follower will be deflected by said abrupt portion overcoming the bias of said spring.

11. The structure described in claim 9, including a pivotal lever and spring means connecting with said lever and rocker arm to thereby actuate said rocker arm when said lever is operated.

12. In a counter, a housing provided with a viewing slot, a shutter slidable relative to said housing and having a viewing slot registrable with said first viewing slot, first and second counterwheels provided with digital indicia observable through said slots when in registry, shaft means supporting said wheels for relative rotation with respect to each other about a common axis, a first gear rotatable with said first wheel, a second gear rotatable with said second wheel, second shaft means, frame means supporting said second shaft means for swinging movement about the axis of said first shaft means, transfer gear means carried by said second shaft means, a cam rotatable with said first wheel and shaped to correspond with the digital indicia carried by said first wheel, third shaft means, a rocker arm pivoted on said third shaft means and engageable with said second shaft means to swing said second shaft means about said first shaft means, a cam follower carried by said rocker arm engageable with said cam thereby to limit swinging movement of said rocker arm and second shaft means about said common axis in accordance with the shape of said cam, a lever for rotating said third shaft means, and pin means fixedly supported by said third shaft means and engageable with said shutter to move said shutter and its slot into registry with said housing slot only when said third shaft is rotated.

13. In a counter, first and second counterwheels mounted for relative rotation about a common axis, a continuous drive means interconnecting said wheel units, means associated with said first wheel unit and movable therewith having spaced points thereon corresponding with various portions of said first wheel unit, and means on said continuous drive means cooperable with said spaced points to retrogress said second counterwheel various amounts in accordance with said various portions.

14. In a counter, first and second counterwheels mounted for relative rotation about a common axis, a continuous drive means interconnecting said wheel units, means associated with said first wheel unit and movable therewith having a surface configuration corresponding with various portions of said first wheel unit, and means on said continuous drive means cooperable with said surface to retrogress said second counterwheel various amounts in accordance with said various portions.

References Cited in the file of this patent

UNITED STATES PATENTS

| | | |
|---|---|---|
| 314,561 | Bouchet | Mar. 31, 1885 |
| 2,089,682 | Chase | Aug. 10, 1937 |
| 2,529,747 | Toorell | Nov. 14, 1950 |
| 2,586,520 | Cunningham | Feb. 19, 1952 |